US 7,993,755 B2
Aug. 9, 2011

United States Patent
Hala et al.

(54) PHOTOCHROMIC MOLDING COMPOSITIONS AND ARTICLES PRODUCED THEREFROM

(75) Inventors: Ralf Hala, Lindenberg (DE); Botho Hoffmann, Domat/Ems (DE); Nikolai Lamberts, Bonaduz (CH)

(73) Assignee: EMS-Patent AG, Domat/Ems (CH)

( * ) Notice: Subject to any disclaimer, the term of this patent is extended or adjusted under 35 U.S.C. 154(b) by 12 days.

This patent is subject to a terminal disclaimer.

(21) Appl. No.: 12/174,430

(22) Filed: Jul. 16, 2008

(65) Prior Publication Data

US 2009/0029154 A1 Jan. 29, 2009

(30) Foreign Application Priority Data

Jul. 25, 2007 (EP) .................................... 07113100

(51) Int. Cl.
*C08G 69/26* (2006.01)

(52) U.S. Cl. .................. 428/474.4; 428/411.1; 428/394; 428/395; 428/357; 428/457; 528/310; 528/338; 528/340; 524/538; 525/410; 525/432

(58) Field of Classification Search ............... 428/474.4, 428/411.1, 457, 357, 394, 395; 524/538; 525/410, 432; 528/310, 338, 340
See application file for complete search history.

(56) References Cited

U.S. PATENT DOCUMENTS 6,943,231 B2 * 9/2005 Buhler .......................... 528/310

FOREIGN PATENT DOCUMENTS

| CA | 02255470 | * | 12/1998 |
|----|----------|---|---------|
| CH | 688 624 | A5 | 12/1997 |
| DE | 3622871 | A1 | 2/1987 |
| DE | 196 42 885 | A1 | 4/1998 |
| DE | 198 20 661 | A1 | 11/1999 |
| DE | 101 22 188 | A1 | 11/2002 |
| DE | 102 24 947 | A1 | 12/2003 |
| EP | 0 922 731 | A1 | 6/1999 |
| EP | 0922731 | * | 6/1999 |
| EP | 1 712 581 | A1 | 10/2006 |
| EP | 1712581 | * | 10/2006 |
| JP | 63027837 | A2 | 2/1988 |
| JP | 01024740 | A2 | 1/1989 |
| JP | 01180536 | A2 | 1/1998 |

* cited by examiner

*Primary Examiner* — Alicia Chevalier
(74) *Attorney, Agent, or Firm* — Sughrue Mion, PLLC

(57) ABSTRACT

A polyamide molding composition is described, comprising at least one transparent polyesteramide in a proportion by weight of from 70 to 99.99% by weight; at least one further polymer in a proportion by weight of from 0 to 30% by weight; at least one photochromic dye in a proportion by weight of from 0.01 to 2% by weight; and also optionally further dyes and/or additives. The invention further encompasses articles manufactured therefrom, e.g. foils, for the coating of photochromic ophthalmic lenses, or the like.

41 Claims, No Drawings

PHOTOCHROMIC MOLDING COMPOSITIONS AND ARTICLES PRODUCED THEREFROM

TECHNICAL FIELD

The present invention relates to photochromic molding compositions and to articles produced therefrom, e.g. transparent extruded or injection-molded parts, and also to processes for the production of these articles. The molding compositions are preferably bulk-colored molding compositions, but coloring in a dip bath or by way of other methods of introducing/metering of the photochromic dye is likewise possible.

PRIOR ART

Photochromic molding compositions are starting materials used for production of photochromic articles, e.g. sunglass lenses which undergo reversible tinting on exposure to light, or similar articles.

Photochromic means that the dye is converted to an excited state via exposure to light (UV or short-wave VIS), the unexcited state and the excited state here having different absorption spectra (cf. definition of Photochromie [photochromicity] in: Römpp Lexikon Chemie [Römpp's Chemical Encyclopedia], 10th edition, page 3303, Georg Thieme Verlag, Stuttgart). The excited state generally has an intense color, whereas the initial form is colorless. The excited dye molecule returns to the unexcited state via a thermal or radiation-induced reverse reaction.

These dyes can be used to produce optical filters whose variability is light-induced, for example by introducing the dye into a plastics matrix (bulk coloring), or by applying a coating with dye onto glass or plastic (cf., for example, J. F. Rabek in "Mechanisms of Photophysical Processes and Photochemical Reactions in Polymers", chapter 10, pages 377-391, for incorporation of such dyes into polymeric matrices).

An important application is provided by ophthalmic lenses, e.g. sunglass lenses, which spontaneously darken when subject to insolation. A plurality of photochromic dyes and/or one or more inert dyes together with the photochromic dye are used in order to give these lenses the desired shade of color. If an inert dye is used, the lens, even in the non-irradiated state, has an underlying tint or a color, and this reduces transmittance.

A significant aspect of such applications is that the number of possible repeats of the reversible photochromic process has been maximized, and that the dye is not irreversibly removed from this cycle by environmental effects (e.g. oxygen) or side reactions (e.g. with the polymer matrix or with additives). A further precondition is that the "switching process" (excitation) and/or the thermal reverse reaction proceed(s) to practical completion within an acceptable period. If this not is the case, tinting of the lens does not occur on exposure to light (no reduction in transmittance), and/or the lens retains its tint for a long time after exposure to light. Both are undesired.

Marketing of the first photochromic plastic lenses began as early as 1980. However, numerous improvements in the dyes and in the polymeric matrices had to be achieved before the photochromic system achieved adequate lifetime and satisfactory spectral performance. Initially, such plastics lenses were practically entirely based on cast systems, e.g. allyl diglycol carbonate CR39, which is obtainable via polymerization of bisallyl carbonates. Later, lenses based on (meth) acrylates and on polycarbonates also became available, and recently the number of lenses produced thermoplastically has increased, materials often used here being thermoplastic polyurethanes (TPU).

Some disclosures from the patent literature in the general context of photochromically doped plastics will be described below. There are intentionally no details given of the wide variety of descriptions of systems such as CR39 which are processed in a casting process with crosslinking to give lenses, since the present invention does not encompass such systems.

JP-A-63027837 describes a photochromic system in which a PET (polyethylene terephthalate) plastics matrix with which a plasticizer has been admixed (from 2 to 15% by weight) is doped with a photochromic dye. The intention of this selection of the matrix is that the long-term stability of such a layer be improved, under constant exposure to light and heat, and this layer can, for example, be applied to a nylon film.

JP-A-01180536 likewise describes a photochromic material intended to be heat-resistant and weather-resistant. It is composed of a plastics matrix composed of a transparent plastic and of an additive which is a polymer having a defined proportion of monomers having hydroxyl groups, e.g. PVB (polyvinyl butyral) or polyvinyl acetate. A wide variety of possible systems is stated as transparent plastic, examples being PMMA, PC, transparent nylon, etc.

JP-A-01024740 is like the two abovementioned specifications from the tinted vehicle windshields sector in describing a multilayer structure composed of two glass layers with an intermediate layer which comprises a photochromic material. A plurality of possibilities is stated as transparent material of this intermediate layer, inter alia vinyl resin, acrylic resin, polyester resin, and polyamide resin. Spirooxazines inter alia are mentioned as dyes, and a specific distribution of the dye is emphasized as advantageous.

WO 01/49478 describes a photochromic lens which is composed of a PC substrate and of a photochromically doped coating composed of thermoplastic polyurethane (TPU). This coating is applied to a PC preform in an in-mold-coating process.

WO 2005/030856 describes photochromic systems composed of a plastic, of a photochromic dye, and of a UV absorber. The advantages attributed to the system described in that document are short switching times and long lifetime. Materials proposed as possible matrix, i.e. plastic in the above sense, are polyamides and polyamide block copolymers inter alia having polyether segments.

US 2007/0045596 describes a photochromic modified, optical article, such as a lens. The photochromic dye here has been embedded in a polymeric acrylate, specifically in an acrylate-modified dendrimeric polymer matrix. An enormously wide variety of systems is given as acrylate-modified dendrimeric polymer matrix, but dendrimeric polyester acrylates are used exclusively in the examples.

U.S. Pat. No. 6,667,099 describes meso- and nanotubes composed of polymer materials, where a large list of possibilities is given as possible materials for the tubes. The materials then listed in the examples then comprise poly(p-xylene), polyimide, aluminum, and silicon, and mention is made in passing of the fact that the cavities of such tubes can be filled with thermochromic or photochromic materials.

EP 1712581 discloses a collection of dye baths and a process for the dyeing or doping of moldings using functional additives in these aqueous dip baths. The moldings, such as ophthalmic lenses, lenses for sunglasses, magnifying glasses, etc., comprise in essence transparent or translucent (co) polyamides, and in particular here inter alia MACM12, or else blends exclusively of (co)polyamides. The color can be designed as homogeneous color or as color having a gradient. Dip bath additives which are a suitable combination of glycols, and a specific dip process, are used to obtain homogeneous color distributions in the molding or in a composite material, comprising said molding, and low haze values are achieved here, <1% with depth of color of from 10 to 93% light transmittance.

EP 0922731 discloses mixtures composed of polyamides and polyesteramides from the sector of transparent foils for food packaging.

BRIEF DESCRIPTION OF THE INVENTION

The invention is therefore based inter alia on the object of providing a photochromic material improved over the materials of the prior art.

This object is achieved in particular in that a photochromic polyamide molding composition is provided which comprises at least one transparent polyesteramide (also termed PEA or PESTA) in a proportion by weight of from 70 to 99.99% by weight; and at least one photochromic dye in a proportion by weight of from 0.01 to 2% by weight. The photochromic polyamide molding composition can optionally include at least one further polymer, in particular in a proportion by weight of from 0 to 30% by weight. The material here can inter alia also optionally comprise further dyes and/or additives. It is preferable that the polyamide molding composition has been formed either solely from one polyesteramide and from the photochromic dye or solely from one polyesteramide, from one further polymer, preferably a polyamide, and from the dye. It is not necessary that photochromic dye has been admixed previously with the material here, and it is also possible to use the mixture composed of polyesteramide and a further polymer as initial charge and to introduce the dye into an article, e.g. in a dip bath, after or during production of the article (e.g. production of a lens in an injection-molding process).

The further polymer is preferably a transparent polymer.

The polyesteramide preferably has at least one amorphous phase which derives from the ester fraction or polyester fraction, where the glass transition temperature of this phase is at most 20° C. The glass transition temperature of this amorphous phase of the transparent polyesteramides is preferably below 0° C., preferably below or at most −20° C. Ideal photochromicity kinetics can thus be obtained.

The hard segment, too, i.e. normally the straight polyamide fraction of the polyesteramide, preferably has a maximum melting point (Tm). This should preferably be at most 240° C., preferably at most 220° C., in particular at most 200° C. With regard to the glass transition temperature, too, the hard segment should not exceed a maximum value. Said maximum value for Tg should be at most 180° C., preferably at most 150° C., in particular at most 140° C.

The term transparent polyesteramide or transparent molding composition or transparent further polymer as used in this specification is intended to designate polyesteramide or further polymers, or molding compositions formed therefrom, whose light transmittance is at least 80%, when the polyesteramide or the molding composition or the further polymer (in pure form, i.e. without the abovementioned further constituents of the molding composition of the invention) takes the form of a thin plaque of thickness 2 mm. Light transmittance is measured here in a UV/VIS spectrometer from Perkin Elmer, in the range from 200 to 800 nm, on disks measuring 70×2 mm. The transmittance value is stated for the wavelength range from 500 to 700 nm or for wavelength 600 nm.

The 70×2 mm disks are by way of example produced for this purpose on an Arburg injection-molding machine, in the polished mold, the cylinder temperature being from 200 to 340° C. and the mold temperature being from 20 to 140° C.

It is preferable, therefore, that the transmittance of the polyesteramide and/or the molding composition be at least 80%, preferably at least 85%, particularly preferably greater than 88%. Lower transparency, and indeed slight haze, is also possible for components of lower optical specification, or for components in which the photochromic processes are relevant only in reflection (for example decorative items). In one preferred embodiment, the transmittance of the further polymer is also at least 85%.

It is moreover preferable that the haze of the polyesteramide and/or of the molding composition is at most 10%, preferably at most 8%, particularly preferably at most 5% (ASTM 1003, layer thickness 2 mm).

Although success was achieved some years ago with production of amorphous polyamides in the purity required for optical applications, for example polyamides of MACM12 type as described in DE-A-196 42 885 and obtainable with trademark Grilamid TR 90 from EMS CHEMIE, Switzerland, simple addition of a photochromic dye cannot give satisfactory photochromic results in lenses produced from pure systems of this type.

MACM here represents the ISO name bis(4-amino-3-methylcyclohexyl)methane, which is obtainable commercially with trademark Laromin C260 grade 3,3'-dimethyl-4,4'-diaminodicyclohexylmethane (CAS No. 6864-37-5). The numeral 12 represents an aliphatic linear C12 dicarboxylic acid (DDA, dodecanedioic acid), with which the diamine MACM has been polymerized.

Surprisingly, it has been found that, contrary to previous experience, to the effect that addition of photochromic dyes to transparent polyamides does not give satisfactory photochromic behavior, when the material of the invention is processed to give photochromic articles it exhibits unexpectedly long-lived reversible photochromic behavior, i.e. photochromic behavior which is capable of many repeats. The preferred dyes are moreover among the most stable photochromic systems. The switching procedure (excitation) moreover proceeds rapidly and the thermal reverse reaction likewise proceeds almost completely within a useful period of from seconds to at most a few minutes.

It is normally only straight polyamide materials whose glass transition temperature is below 100° C., i.e. not those taking the form of polyesteramide, that exhibit pronounced photochromic behavior (examples being MACM36 or PACM36, where PACM represents the ISO name bis(4-aminocyclohexyl)methane, which is obtainable commercially as a grade of Dicykan 4,4'-diaminodicyclohexylmethane (CAS No. 1761-71-3)). However, the shortcomings in the mechanical or thermal properties of these generally make them unsuitable, for example, for ophthalmic lens applications. The addition of a further polymer to a transparent (co)polyamide, alongside the dye, is possible. However, high requirements are placed upon these polymers or the resultant mixture (blend), particularly for ophthalmic lens applications, and admixture usually results in haze in the blend. The optical properties (transmittance, haze, Abbe number) of the mixtures (blends) should however not be substantially inferior to those of the straight polyamides. The photochromic process should have good kinetics (darkening and fading within a period of from seconds to a few minutes, preferably within from 20 to 60 seconds), and proceed over a long lifetime. This is the case with the materials proposed and with the articles produced therefrom. As mentioned above, these good properties of the bulk-colored articles also arise when the article is manufactured from the blend without dye and the dye is introduced after the molding of the article, e.g. in a dip bath. The presence of the optional further polymer alongside the transparent polyesteramide can create, for the photochromic dyes, an environment which permits reversible action of the configuration changes and/or conformation changes which mostly arise during excitation of the dyes and are generally required for the color change, but this can also be achieved in the polyesteramide alone.

Examples of further polymers that can be used are polyamides and/or copolyamides as described in DE-A-102 24 947, DE-A-101 22 188, CH-A-688 624 or EP-A-0 725 100, or a mixture thereof. The disclosure of said documents and the polyamide systems and copolyamide systems mentioned therein is expressly incorporated into this description in relation to transparent polyamides as further polymers. Particular preference is given to those amorphous or microcrystalline polyamides whose chemical constitution is close to the constitution of the polyamide fraction in the polyesteramide used or is identical therewith or is compatible therewith. If, by way of example, a polyesteramide having a hard segment based on MACM12 is used, the preferred further polymer is likewise in essence based on the polyamide MACM12.

One of the advantages of the use of polyesteramides as base material is that, in contrast to the materials such as CR39 or acrylate which have hitherto been used for the production of ophthalmic lenses, these being materials which require traditional casting methods with attendant polymerization (crosslinking), transparent polyesteramides or their blends can be processed in simple injection-molding processes with low cycle times, i.e. can be mass-produced at low cost. The polyamide molding composition of the invention is therefore also preferably non-crosslinkable.

An advantage in comparison with polyamide molding compositions having high content of homopolyamide/copolyamide is the relatively low processing temperature, which in the case of the polyamide molding compositions of the invention can be in the range from 180 to 260° C., whereas in the case of polyamide molding compositions having at least 50% homopolyamide/copolyamide content this temperature is in a higher range, from 240° C. to 320° C. The high proportion of flexible polyesteramide moreover makes a molding composed of the proposed polyamide molding composition markedly more flexible and also more impact-resistant. These moldings are therefore, for example, particularly suitable for the coating of a lens using this type of polyesteramide foil with photochromic dye. It has namely been found that the proposed materials pass the impact-resistance and notched-impact-resistance test to ISO 179 at room temperature with no fracture.

According to one first preferred embodiment, the polyamide molding composition is one wherein at least one polyesteramide, or the sole polyesteramide present, is composed of a polyamide fraction making up from 40 to 95% by weight and of a polyester fraction making up from 5 to 60% by weight. The arrangement of the polyamide units and polyester units here as repeat units in the polyesteramide can be random, alternating, or blockwise. The polyesteramides of the invention can, by way of example, be produced in a process as described in, and using starting materials as described in, DE 19820661C1. Preference is given here to polyamide components and, respectively, hard segments of polyamide based on the aliphatic polyamides PA6, PA66, PA69, PA610, PA1010, PA11, PA12, PA612, PA6/12, PA614, PA618, and PA636, and also to their copolymers.

However, particular preference is given to polyesteramides which contain amorphous or microcrystalline hard segments. The number-average molar mass of the amorphous or microcrystalline hard segments of polyamide in the polyesteramides of the invention is in the range from 500 to 5000 g/mol, preferably in the range from 700 to 4000 g/mol, and very particularly preferably in the range from 750 to 3000 g/mol.

If a microcrystalline polyamide hard segment or, respectively, hard segment of a copolyamide is used, it is preferable that the enthalpy of fusion of this microcrystalline polyamide hard segment and/or hard segment of a copolyamide is in the range from 4 to 40 J/g, in particular in the range from 4 to 25 J/g (measured by differential scanning calorimetry, DSC). It is preferable that microcrystalline hard segment constitutions of a polyamide/copolyamide are polyamide systems which give transparent moldings when processed in high-molecular-weight form and without further constituents. This means that the size of the crystallites is below the wavelength of visible light. As stated above, the selection of the hard segment is preferably such that melting point and/or glass transition temperature do not exceed a preferred maximum value. The glass transition temperature of the microcrystalline polyamide hard segment preferably moreover is above at least 50° C., preferably above 80° C. and particularly preferably above 100° C., its melting point being at least 120° C., preferably at least 135° C., and in particular at least 150° C.

In one preferred embodiment, the polyamide hard segment is a microcrystalline polyamide and/or copolyamide based on a cycloaliphatic diamine and/or on a diamine having an aromatic ring (e.g. MXDA or PXDA). It is preferable here that this has been based on cycloaliphatic diamines and on aliphatic dicarboxylic acids having from 6 to 18 carbon atoms, where the cycloaliphatic diamine is preferably MACM and/or PACM and/or IPD (isophoronediamine) having or not having additional substituents, particularly preferably being a copolyamide of MACM/PACM type in each case using aliphatic dicarboxylic acids having from 6 to 18 carbon atoms, e.g. MACM12/PACM12, preferably using a PACM concentration greater than 55 mol %, in particular greater than 70 mol %. MACM here is the ISO name bis(4-amino-3-methylcyclohexyl)-methane, which is obtainable commercially with trademark Laromin C260 grade 3,3'-dimethyl-4,4'-diaminodicyclohexylmethane (CAS No. 6864-37-5). The numeral after the expression MACM in each case represents an aliphatic linear dicarboxylic acid (for example, C12 being dodecanedioic acid) with which the diamine MACM has been polymerized. PACM is the ISO name bis(4-aminocyclohexyl)methane, which is obtainable commercially as a grade of Dicykan 4,4'-diaminodicyclohexylmethane (CAS No. 1761-71-3).

As an alternative or in addition it is possible, as explained above, that the polyamide hard segment is an amorphous polyamide and/or copolyamide, its enthalpy of fusion then preferably being less than 4 J/g (measured by differential scanning calorimetry, DSC). The glass transition temperature of the amorphous polyamide hard segment is preferably above at least 50° C., preferably more than 80° C., and particularly preferably more than 100° C.

Another preferred embodiment is one wherein the amorphous polyamide hard segment and/or amorphous copolyamide hard segment is one based on aliphatic and/or cycloaliphatic diamines, and preference is given to amorphous polyamides of MACMI/12 type, where the content of laurolactam in this case is preferably smaller than 50 mol %, in particular smaller than 35 mol %. I in each case here represents isophthalic acid.

In another embodiment, the polyamide hard segment is based on aromatic dicarboxylic acids having from 8 to 18 carbon atoms or on aliphatic dicarboxylic acids having from 6 to 36 carbon atoms, or is a mixture of these homopolyamides and/or copolyamides, preferably being based on lactams and/or aminocarboxylic acids, where the aromatic dicarboxylic acids are by way of example TPA (terephthalic acid) and/or IPA (isophthalic acid). The hard segment of a homopolyamide and/or of a copolyamide can advantageously be a polyamide selected from the group of: 6I/6T, TMDT, 6I/MACMI/MACMT, 6I/6T/MACMI, MACMI/MACM36, 6I, and lactam-containing polyamides, such as 12/PACMI, 12/MACMI, 12/MACMT, 6/PACMT, 6/6I, 6/IPDT, or a mixture thereof. Other possible systems are: MACM6-18 or PACM6-18, MACM6-18/PACM6-18, 6I/PACMI/PACMT, or a mixture formed therefrom. The ISO 1874-1 names have been used for the polyamides. In each case, here, I represents isophthalic acid and T represents terephthalic acid, and TMD represents trimethylhexamethylene-diamine, and IPD represents isophoronediamine.

It is moreover advantageous and possible that the hard segment of a homopolyamide and/or of a copolyamide is a polyamide based on at least one dicarboxylic acid and on at least one diamine having an aromatic ring, preferably based on MXD (meta-xylylenediamine), where the dicarboxylic acid can be aromatic and/or aliphatic, and where a preferred example of the material is 6I/MXDI.

Another preferred embodiment is one wherein the proportion by weight present of the at least one transparent polyesteramide is from 80 to 99.9% by weight, preferably from 90 to 99.9% by weight, particularly preferably from 95 to 99.9% by weight, and it is particularly preferable that there is only one such transparent polyesteramide present. It is particularly preferable that the polyamide molding composition comprises no further polymer.

Another preferred embodiment is one wherein the solution viscosity ($\eta_{rel}$) of the polyesteramide in m-cresol, 0.5% by weight solution, at 20° C., is from 1.3 to 2.5, particularly preferably from 1.4 to 2.3, and/or its modulus of elasticity is less than 2000 MPa, preferably less than 1200 MPa, particularly preferably less than 500 MPa.

The solution viscosity or relative viscosity of the further polymer $\eta_{rel}$ is preferably from 1.3 to 2.0, in particular from 1.40 to 1.85. The glass transition temperature $T_g$ of the further polymer is moreover normally above 90° C., preferably above 110° C., particularly preferably above 130° C.

The glass transition temperature of the further polymer can in particular be above 90° C. and its transmittance can in particular be more than 80% or more than 85%.

The following structural starting materials are preferred in relation to the polyesteramide: transparent polyesteramide based on at least one polyamide and based on at least one polyester fraction and/or ester fraction, where the polyamide has been formed from dicarboxylic acids and from diamines, and/or from lactams and/or aminocarboxylic acids, and the polyester fraction and/or ester fraction has been formed from a diol and from a dicarboxylic acid.

Dicarboxylic Acid (Both for Polyamide Fraction and for Polyester Fraction):

The at least one dicarboxylic acid can have been selected from the following group: aliphatic C4-C44 diacid, cycloaliphatic C8-C36 diacid, aromatic diacid (preferably TPA, IPA, NDA), or else a mixture or combination thereof. The at least one dicarboxylic acid has preferably been selected from the group of: adipic acid, sebacic acid, dodecanedioic acid, terephthalic acid, isophthalic acid, cyclohexanedicarboxylic acid, and mixtures thereof.

Diamine:

Diamine selected from the group of: branched or unbranched aliphatic C4-C18 diamine, cycloaliphatic C8-C20 diamine, diamine having an aromatic ring (preferably MXDA, PXDA), polyoxyalkylenediamines (C2-C4-alkylene), and also mixtures or combinations thereof. The at least one diamine has preferably been selected from the group of: methylpentanediamine, hexanediamine, methyloctanediamine, nonanediamine, decanediamine, dodecanediamine, m-xylylenediamine, MACM, PACM.

Lactam or Aminocarboxylic Acid:

Lactam or aminocarboxylic acid selected from the group of: caprolactam, laurolactam, aminocaproic acid, aminolauric acid, aminoundecanoic acid.

Diol:

Diol selected from the group of: aliphatic C2-C36 diol, cycloaliphatic C6-C36 diol, C8-C36 diol having an aromatic ring, a diol containing ether groups, polycaprolactonediol, or a combination thereof. The diol has preferably been selected from the group of: ethanediol, propanediol, butanediol, hexanediol, cyclohexanedimethanol, C36 dimer fatty diol, polyoxyalkylenediols (C2-C4-alkylene) (in particular with a molar mass in the range from 200-2000 g/mol), polycaprolactonediol with a molar mass in the range from 500 to 3000 g/mol (particularly preferably from 750 to 2000 g/mol), and also combinations thereof.

If polyoxyalkylenediols and/or -diamines are used, their concentration, based on the entire polyester fraction or ester fraction, known as the soft segment, is preferably at most 75% by weight, particularly at most 50% by weight.

Preferred Polyamide Fraction:

The transparent PESTA is preferably a polyesteramide based on a polyamide system selected from the group of: PA6, PA66, PA610, PA612, PA6/12, PA1010, PA11, PA12, PA MACM6-18, PA PACM6-18, MACM6-18/PACM6-18, a copolyamide involving 6T, 9T, 10T, and/or 12T units, and mixtures and/or combinations thereof.

Preferred Polyester Fraction and/or Ester Fraction:

The transparent PESTA is preferably a polyesteramide based on a polyester fraction and/or ester fraction using a polyester composed of a C36 diol and/or adipic acid and/or sebacic acid and/or C36 dimer fatty acid and/or terephthalic acid.

The further polymer can be a polyamide based on aliphatic and/or cycloaliphatic diamines and on aliphatic and/or aromatic dicarboxylic acids having from 6 to 40, preferably from 6 to 36, particularly preferably 10, 12, 14, or 18, carbon atoms, or is a mixture of homopolyamides and/or copolyamides of this type, and/or is a polyamide block copolymer having soft segments, and/or a system selected from the following group: polyester having soft segments; TPU elastomers having soft segments; acrylate polymer; methacrylate polymer, particularly preferably having long pendant groups; polycarbonate copolymer; styrene copolymer, preferably based on acrylonitrile, butadiene, acrylate, methacrylate; polyolefin, in particular grafted polyolefin; ethylene copolymers, in particular based on propene, butene, pentene, hexene, octene, decene, undecene, butadiene, styrene, acrylonitrile, isoprene, isobutylene, derivatives of (meth)acrylic acid, vinyl acetate, tetrafluoroethylene, vinylidene fluoride, hexafluoropropene, and 2-chlorobutadiene; polyisobutylene; polybutyl acrylate, and also combinations and mixtures thereof.

In principle, as stated in the above definition, the further polymer can be a microcrystalline polyamide or an amorphous polyamide or a mixture of two (or more) of such polyamides (or equally of the corresponding copolyamides).

If a microcrystalline polyamide or, respectively, copolyamide is used, it is preferable that the enthalpy of fusion of said microcrystalline polyamide and/or copolyamide is in the range from 4 to 40 J/g, in particular in the range from 4 to 25 J/g (measured by differential scanning calorimetry, DSC). The microcrystalline polyamide/copolyamide is preferably a polyamide which gives transparent moldings when processed without any further constituents.

In one preferred embodiment, the further polymer is a microcrystalline polyamide and/or copolyamide based on a cycloaliphatic diamine and/or on a diamine having an aromatic ring (e.g. MXDA or PXDA).

It is preferable here that this is composed of cycloaliphatic diamines and of aliphatic dicarboxylic acids having from 6 to 18 carbon atoms, where the cycloaliphatic diamine is preferably MACM and/or PACM and/or IPD (isophoronediamine) having or not having additional substituents, and it is particularly preferable that the entirety is a copolyamide of MACM/PACM type, in each case using aliphatic dicarboxylic acids having from 6 to 18 carbon atoms, e.g. MACMI2/PACM12, preferably using a PACM concentration greater than 55 mol %, in particular greater than 70 mol %.

As an alternative, or in addition, as explained above, the further polymer can be an amorphous polyamide and/or copolyamide, whose enthalpy of fusion is then preferably less than 4 J/g (measured by differential scanning calorimetry, DSC). The glass transition temperature of the amorphous polyamide used as component B is preferably above 90° C., preferably above 110° C., and particularly preferably above 130° C.

Another preferred embodiment is one wherein the further polymer is an amorphous polyamide and/or copolyamide based on aliphatic and/or cycloaliphatic diamines, preference being given to amorphous polyamides of MACMI/12 type, where the content of laurolactam is in this case preferably smaller than 50 mol %, in particular smaller than 35 mol %. I in each case here represents isophthalic acid.

The further polymer can therefore be a polyamide based on aromatic dicarboxylic acids having from 8 to 18 carbon atoms or on aliphatic dicarboxylic acids having from 6 to 36 carbon atoms, or can be a mixture of such homopolyamides and/or copolyamides, preferably based on lactams and/or aminocarboxylic acids, where the aromatic dicarboxylic acids are by way of example TPA (terephthalic acid) and/or IPA (isophthalic acid). The (transparent) homopolyamide and/or copolyamide can advantageously be a polyamide selected from the group of: 6I/6T, TMDT, 6I/MACMI/MACMT, 6I/6T/MACMI, MACMI/MACM36, 6I, and lactam-containing polyamides, such as 12/PACMI, 12/MACMI, 12/MACMT, 6I/PACMT, 6/6I, 6/IPDT or a mixture thereof. Other possible systems are: MACM6-18 or PACM6-18, MACM6-18/PACM6-18, 6I/PACMI/PACMT, or a mixture formed therefrom.

It is moreover advantageous and possible that the further polymer is a homopolyamide and/or copolyamide based on at least one dicarboxylic acid and on at least one diamine having an aromatic ring, preferably based on MXD (meta-xylylenediamine), where the dicarboxylic acid can be aromatic and/or aliphatic, and where the material is, for example, preferably 6I/MXDI.

The further polymer can be a homopolyamide selected from the group of MACM12 (e.g. Grilamid TR 90), MACM14, MACM 18, and/or a copolyamide selected from the group of MACM12/PACM12, MACM14/PACM14, MACM18/PACM18, and/or a homopolyamide and/or copolyamide based on aromatic dicarboxylic acids having from 8 to 18 carbon atoms, or a mixture of such homopolyamides and/or copolyamides, preferably based on lactams and/or aminocarboxylic acids, where the aromatic dicarboxylic acids are preferably TPA (terephthalic acid) and/or IPA (isophthalic acid). The refractive index of such systems is preferably greater than or equal to 1.50, the Abbe number being greater than or equal to 40, and the density being less than or equal to 1.1 g/cm$^3$.

The transparent homopolyamide and/or copolyamide as further polymer is preferably a polyamide selected from the group of: 6I/6T, TMDT, 6I/MACMI/MACMT, 6I/6T/MACMI, MACMI/MACM36, 6I, 12/PACMI, 12/MACMI, 12/MACMT, 12/MACM12, 6/PACMT, 6/6I, 6/IPDT, or a mixture thereof.

It is generally advantageous that the solution viscosity ($\eta_{rel}$) of the further polymer, particularly in the form of a transparent homopolyamide and/or copolyamide, is from 1.3 to 2.0, particularly preferably from 1.40 to 1.85, and/or that its glass transition temperature $T_g$ is above 90° C., preferably above 110° C., particularly preferably above 130° C.

The haze and the photochromic effect can be improved by addition of nylon-12, in particular of low-viscosity PA12 (solution viscosity or relative viscosity $\eta_{rel}$—to DIN EN ISO 307 in 0.5% strength by weight m-cresol solution at 20° C.—from 1.5 to 2.0, preferably from 1.6 to 1.9).

The addition of nylon-12 and/or polyamide oligomer moreover permits less aggressive processing of the photochromic polyamide molding composition or less aggressive incorporation of the photochromic dye into the thermoplastic molding composition, thus enabling degradation of the sensitive photochromic dye to be substantially prevented during the extrusion and/or injection-molding process. An example of a suitable polyamide oligomer is a nylon-12 oligomer, preferably with an average molar mass of from 1500 to 2500 g/mol, particularly preferably with mainly non-condensable alkyl end groups.

Possible gate marks can be avoided if the ratio of the solution viscosities of the further polymer and of the polyesteramide is smaller than 1.2, in particular smaller than 1.1 (for the purposes of this disclosure $\eta_{rel}$ is always to DIN EN ISO 1628-1 or DIN EN ISO 307). Haze, too, is reduced as the ratio of the solution viscosities of the two polymer components falls, for identical chemical constitution of the polymer components. Addition of nylon-12 oligomer makes overall processing easier, because of the lower melt viscosity and higher flow path length.

The photochromic dye is normally a dye which is reversibly excitable by UV or short-wave VIS, preferably being a dye based on spirooxazines. Excitable means that excitation can convert it to a state in which its absorption spectrum alters in such a way that visible light is absorbed, when the dye has been embedded within the matrix composed of polymer, i.e. in the transparent polyesteramide of the invention and in the blend of transparent polyesteramide and further polymer. The filter effect achievable in the visible spectral range can be adjusted widely via the selection of the photochromic dyes and adjustment of the concentration. For example, a reduction of the initial transmittance (generally from 80 to 90%) to 40% or even 10% can be achieved completely reversibly (in each case measured on a plaque of thickness 1, 2 or 3 mm, with flat parallel sides). The photochromic dye is used here at a concentration in the range from 0.01 to 2%, preferably in the range from 0.05 to 0.15%, in particular in the range from 0.1 to 1%.

Other possible dyes which can be incorporated as photochromic systems are described by way of example in Kirk-Othmer Encyclopedia of Chemical Technology Vol. 6, "Chromogenic Materials, Photochromic", pages 587-605, John Wiley and Sons, Inc., or else in: Heinz Dürr, Henri Bouas-Laurent (Eds.), Photochromism: Molecules and Systems, Elsevier 2003. These dyes are expressly incorporated into the present disclosure for incorporation into the blends of the invention, preference being given here to the spirooxazines described in those references. Other possible systems are in particular those described in DE-A-36 22 871, or as described in WO 2005/030856, or as described in EP-A-0 313 941. These dyes too, are expressly incorporated herein by way of reference.

The switching times relating to darkening (coloring of the component by virtue of irradiation with the excitation wavelength of the dye) and lightening (thermal reverse reaction of the dye to give the form that does not absorb in the visible wavelength region) are very rapid and amount to only a few seconds (from 5 to 20 seconds for the defined cycle at room temperature. cf. text at a later stage below).

The additives mentioned can be stabilizers, such as UV stabilizers, heat stabilizers or free-radical scavengers, and/or can be processing aids, plasticizers, or further polymers, and/or can be functional additives, preferably for influencing optical properties, such as in particular refractive index, or can be a combination or mixture thereof. The molding compositions can moreover include nanoscale fillers and/or nanoscale functional materials, examples being laminar minerals or metal oxides which increase the refractive index of ophthalmic lenses.

Optical filtering has two functions in spectacle lenses. Firstly, the intensity of light impacting the eye is reduced, and secondly dangerous UV radiation is prevented from entering the eye. Since most photochromic dyes have intensive absorption bands in the UV-A and UV-B region, even low concentrations of further UV absorbers (UV blockers), such as Tinuvin 326, are sufficient to achieve sufficiently high absorption in the UV region for spectacle lenses.

The present invention further provides a transparent, preferably haze-free article with at least one region or one layer composed of a polyamide molding composition characterized above.

In particular, it provides an article of this type for high-specification optical applications, the article then in particular being one whose haze is less than 10, preferably less than 8, and whose transmittance is more than 80%, preferably more than 85%, in the wavelength range from 500-700 nm, when the layer thickness of the layer composed of the polyamide molding composition is 2 mm.

This type of article can be a foil, a profile, a tube, a hollow body, or an optically variable filter, or an optical lens. By way of example, it can therefore be an ophthalmic lens or a foil in the form of a coating for a lens of this type, and can particularly preferably be an element with spectral filter action, e.g. in the form of a spectacle lens, sun lens, corrective lens, or optical filter, or in the form of a switching assembly for optical signal processing, ski goggles, visor, safety spectacles, photorecording, display, optical data storage, or windows of buildings and of vehicles, or in the form of a foil for the coating of any of these components, or can be a decorative element or a structural element, for example in the form of a spectacle frame, toy, or cover, particularly in the form of a mobile-telephone case, a part of electronic devices, a coating, particularly of packaging, of decorative items, of sports equipment, or of cladding, preferably in the automobile sector.

The article here can have a color gradient and/or a photochromic coating, an antireflective coating, a scratch-resistant coating, an optical filter coating, a polarizing coating, an oxygen-barrier coating, or a combination of these coatings.

The glass transition temperature of the region or the layer composed of the polyamide molding composition is typically above 50° C., preferably above 80° C., particularly preferably above 100° C., and/or its melting point is above 120° C., preferably above 135° C., particularly preferably above 150° C.

The photochromic polyesteramide molding compositions can be converted directly via injection-molding into bulk-colored components. However, it is also conceivable that foils or inserts composed of the photochromic molding compositions are in-mold-coated with transparent polyamide or with other polymers. Components can moreover also be doped with the photochromic dye via a suitable tinting transfer process or thermal transfer process. The molding compositions of the invention can be processed not only by injection molding but also by extrusion, for example to give fibers, foils, tubes, profiles, or a hollow body.

The present invention also accordingly provides a process for the production of an article as described above, i.e. based on the polyesteramide molding composition described at an earlier stage above. The process is particularly preferably one which comprises molding this polyamide molding composition in an extrusion process, in an injection-molding process, or in an in-mold-coating process, to give the article, where the photochromic dye can, if appropriate, be introduced in a downstream dip bath process and/or thermal transfer process into the mixture composed of transparent polyesteramide and of further polymer, and where the photochromic article can also be a foil which can be applied to a substrate, preferably an optical lens, via lamination, or adhesive bonding.

The photochromic dye can be compounded together with the polyesteramide and with the further polymer, and the dye here can be added in the form of a liquid concentrate to the polymer melt composed of polyesteramide and of further polymer with the aid of a metering pump, and/or the dye can be applied in the form of solid or liquid (e.g. in solution) to the other components in a drum mixer, and use may also, if appropriate, be made of aids to a rolling application process.

The present invention also provides a process for the production of a bulk-colored molding, wherein the dye and the polyesteramide and/or the further polymer is processed to give a masterbatch with high color concentration, preferably up to 30%, and the required amount of said masterbatch is processed with the polyesteramide and/or with the further polymer in an extruder to give pellets or is directly converted in the injection-molding machine to the finished molding.

Further embodiments are described in the dependent claims and are included in the description.

METHODS OF CARRYING OUT THE INVENTION

Examples will be used below to illustrate the invention. The examples are intended to indicate how a polyamide molding composition can be prepared and, for example, processed to give a molding, they are not intended to be interpreted as restricting the protected subject matter defined in the annexed patent claims.

Inventive Examples 1 to 6 and Comparative Examples (CE) 1 and 3

The starting materials IE1-IE5 (all grades of PESTA) and CE1 (polyetheramide) and also CE3 (MACM12 without soft segments) were first prepared in a polymerization process. Table 1 collates the corresponding constitutions and properties measured on the polymerized material:

TABLE 1

Constitution and properties of inventive examples IE 1-IE 5 and of comparative examples CE 1 and CE 3, where nss represents: no soft segment present; n.f. represents: no fracture, and n.m. represents: not measurable.

| | | Inventive examples/Comparative examples | | | | | | |
|---|---|---|---|---|---|---|---|---|
| | | IE 1 | IE 2 | IE 3 | IE 4 | IE 5 | CE 1 | CE 3 |
| Constitution | | | | | | | | |
| DDA | % by wt. | 37.0 | 39.9 | 37.7 | 0.0 | 0.0 | 45.2 | 49.1 |
| MACM | % by wt. | 24.5 | 30.8 | 21.3 | 0.0 | 0.0 | 34.8 | 50.9 |
| Laurolactam | % by wt. | 0.0 | 0.0 | 0.0 | 41.2 | 44.8 | 0.0 | 0 |
| Terephthalic acid | % by wt. | 0.0 | 0.0 | 0.0 | 11.7 | 12.7 | 0.0 | 0 |
| Pripol 2033 | % by wt. | 29.2 | 22.2 | 40.9 | 35.8 | 42.4 | 0.0 | 0 |
| Priplast 3197 | % by wt. | 9.2 | 7.0 | 0.0 | 11.2 | 0.0 | 0.0 | 0 |
| Tyzor NPZ | % by wt. | 0.1 | 0.1 | 0.1 | 0.1 | 0.1 | 0.0 | 0 |
| Elastamine RP-409 | % by wt. | 0.0 | 0.0 | 0.0 | 0.0 | 0.0 | 20.0 | 0 |
| Properties | | | | | | | | |
| Number-average molar mass (theor.) of PA segment | g/mol | 1000 | 1500 | 75000 | 750 | 750 | 1500 | 22500 |
| Rel. viscosity | | 1.43 | 1.49 | 1.37 | 1.58 | 1.63 | 1.40 | 1.74 |
| COOH | mmol/kg | 5 | 34 | 10 | 30 | 20 | 103 | 35 |
| $NH_2$ | mmol/kg | 11 | 11 | 5 | 3 | 12 | 14 | 54 |
| Tg (hard segments of PA) | °C. | 75 | 85 | 83 | 11 | 11 | 90 | 154 |
| Tg(softsegment) | °C. | −25 | −25 | −27 | −23 | −20 | −33 | nss |
| Tm | °C. | 194 | 202 | 195 | 131 | 138 | 205 | n.m. |
| Hm | J/g | 6 | 13 | 9 | 21 | 24 | 15 | n.m. |
| Tensile modulus of elasticity | MPa | 230 | 240 | 100 | 60 | 80 | 1350 | 1520 |
| Ultimate tensile strength | MPa | 23 | 25 | 24 | 20 | 24 | 34 | 45 |
| Ultimate tensile strain | % | 280 | 280 | 400 | 380 | 360 | 3 | 120 |
| Impact resistance, 23° C. | $kJ/m^2$ | n.f. | n.f. | n.f. | n.f. | n.f. | 17 | n.f. |
| Impact resistance, −30° C. | $kJ/m^2$ | n.f. | n.f. | n.f. | n.f. | n.f. | 27 | n.f. |
| Notched impact resistance, 23° C. | $kJ/m^2$ | n.f. | n.f. | n.f. | n.f. | n.f. | 4 | 12 |
| Notched impact resistance, −30° C. | $kJ/m^2$ | 40 | 39 | 90 | 75 | 80 | 1.6 | 12 |

The following materials are used here:
DDA Dodecanedioic acid
MACM Bis(4-amino-3-methylcyclohexyl)methane
Pripol 2033 is a C36 diol (CAS No. 147853-32-5), obtainable from Uniqema
Priplast 3197 is a dimer diol dimerate (CAS No. 177591-08-1), prepared from dimer diol, e.g. Pripol 2033, and from C36 dimer fatty acid obtainable from Uniqema
Tyzor NPZ Tetra(n-propyl) zirconate, obtainable from Dupont.
Elastamine RP-409 is a polyetherdiamine whose molar mass is about 440 g/mol and is obtainable from Huntsman.

The starting materials were prepared as follows by charging the above-mentioned materials in a stirred tank:

The polyamide hard segment is first polycondensed in a first stage. For this, the polyamide-forming monomers (MACM, dodecanedioic acid, etc.) and antifoam are first charged to the reactor and inertized with nitrogen. The reactor is then heated to 270° C., and the reaction mixture is stirred for 4 hours under a blanket nitrogen (baro-degassing) at a product temperature of 260° C.

In the inventive examples, the carboxy-terminated polyamide hard segments are reacted in a second stage with diols and/or with hydroxy-terminated polyesters. For this, a mixture composed of diol, polyester, and esterification catalyst is added to the melt of the polyamide hard segments (product temperature: from 230 to 260° C.).

In the comparative example, the carboxy-terminated polyamide hard segment is reacted with the polyetherdiamine in a second stage. For this, the polyetherdiamine preheated to 150° C., if appropriate together with stabilizers and with condensation accelerators, is added to the melt of the polyamide hard segment, the product temperature of the melt being from 230 to 260° C.

The pressure in the reactor is then reduced to 200 mbar within a period of 60 minutes. Once the reaction mixture had been stirred at said pressure for 30 minutes, the pressure is lowered with a period of 60 minutes to a final pressure smaller than 20 mbar. As soon as the desired torque is achieved, the vacuum is broken, and nitrogen at 5 bar is applied to the polymer melt, which is discharged through dies into a water bath. The extrudates drawn off are pelletized and the pellets are dried at 80° C. for 24 h.

The spirooxazine dyes (OP 14 BLUE) were applied in a drum mixer to the pellets of the transparent polyesteramides (IE1-IE5) or of the polyetheramide (CE1) with the aid of Tween 20 (0.05% by weight). These mixtures were then processed in an Arburg Allrounder 350-90-220D injection-molding machine to give plaques of size 30×30×1 mm (standard mold) and 70×2 mm (disk; polished mold), the cylinder temperatures being from 180-260° C. and the mold temperature being from 20 to 60° C. The screw rotation rate was from 150 to 400 rpm.

Table 2 collates the constitutions of the photochromic polyamide molding compositions used in each of the examples.

TABLE 2

Constitution and optical properties of photochromically modified molding compositions IE6-IE11 and CE2, and also CE4

| | | IE 6 | IE 7 | IE 8 | IE 9 | IE 10 | IE 11 | CE 2 | CE 4 |
|---|---|---|---|---|---|---|---|---|---|
| Constitution | | | | | | | | | |
| IE1 | % by wt. | 99.8 | | | | | | | |
| IE2 | % by wt. | | 99.8 | | | | | | |
| IE3 | % by wt. | | | 99.8 | | | | | |
| IE4 | % by wt. | | | | 99.8 | | | | |
| IE5 | % by wt. | | | | | 99.8 | 80.0 | | |
| CE1 | % by wt. | | | | | | | 99.8 | |
| CE3 | % by wt. | | | | | | 19.8 | | 99.8 |
| OP14 | % by wt. | 0.2 | 0.2 | 0.2 | 0.2 | 0.2 | 0.2 | 0.2 | 0.2 |
| Optical properties based on 2 mm plaques | | | | | | | | | |
| Photochromic behavior | | + | + | ++ | ++ | ++ | ++ | − | −− |
| Transmittance at 600 nm in unexcited state | % | 85 | 88 | 85 | 92 | 92 | 92 | 73 | 78 |
| Transmittance at 600 nm in excited state | % | 30 | 32 | 25 | 20 | 22 | 24 | 51 | 70 |
| Haze in unexcited state | % | 3.4 | 2.4 | 2.6 | 7.9 | 7.4 | 3.8 | 18 | 1.6 |

The evaluation used in the table for photochromic behavior, using the symbols −−, −, o, +, and ++ is based on qualitative visual assessment, this being based on the rapidity of coloring and of fading (kinetics), and also on the depth of color achievable after irradiation.

The polyamide hard segment underlying examples IE1-IE3 and underlying comparative example CE1 is a highly transparent material (transmittance at 600 nm>92%) in high-molecular-weight form (PA MACM12) which has ideal processability, and has haze<1% (for 2 mm layer thickness). Despite a relatively high fraction of said transparent hard segment, the polyetheramide from CE1 has markedly poorer values in relation to transparency and to haze.

IE11 is a blend composed of IE5 (transparent polyesteramide) and CE3 (MACM12 with no soft segment) with added photochromic dye, to demonstrate that further transparent polymers can also be present in a proportion by weight of at most 30% by weight, preferably at most 20% by weight.

Comparative example CE4 is a photochromically modified MACM12 described in EP 1 712 581, discussed in the introduction, and confirms (cf. also Table 4 below) that the systems described in that document are far from having the same high-specification (optical) properties, and in particular it is impossible to achieve a rapid color change.

The optical measurements were carried out on Datacolor SF 600Plus color measurement equipment. An LED panel (10×8 diodes) with an emission maximum at about 415 nm (half-value width about 50 nm) was used for excitation of the dyes, applying a voltage of 27 V with a current of 0.05 ampere. This method was selected since the effect achieved by this irradiation was the same, with respect to the photochromic effect, as that occurring at the applicant's location using natural insolation from a cloudless sky. The spectral studies were carried out at a temperature of 20° C., and it is known that the kinetics of darkening and of fading are temperature-dependent.

The plaques were then placed, unirradiated, in the beam path of the flash lamp (transmittance measurement mode), and the absorption spectrum was measured from 400 to 700 nm. The plaque was then irradiated for 30 sec by means of the LED panel and the absorption spectrum was recorded immediately after removal of the radiation source. The absorption spectrum thus measured provides the maximum achievable darkening (color saturation) for the purposes of present considerations. However, because the reverse reaction of the dye to give its colorless form is sometimes very rapid, with resultant fading of the plaque, a maximum darkening thus determined is markedly below the genuine saturation achieved under irradiation, since up to 2 seconds can pass before the actual spectral measurement takes place. It is clear that the reverse reaction takes place most rapidly specifically in the state of maximum darkening, at which the highest concentration of excited dye molecules is present.

In order to measure the rate of fading, the absorption spectrum was recorded at various times after removal of the radiation source. The transmittance values determined at various junctures at wavelength 600 nm are collated in Table 3 and 4 for examples IE6 to IE11, and also for comparative examples CE2 and CE4.

Markedly longer irradiation with the LED panel gave more marked darkening (saturation) than shown in the values of Table 3.

TABLE 3

Transmittance (%) at 600 nm measured on 30 × 30 × 1 mm plaques as a function of time (fading); plaques were previously irradiated for 30 seconds with the LED panel; "0 seconds" therefore represents the first measurement after the end of irradiation.

| Time (seconds) | Plaque composed of molding composition of inventive example IE 6 | Plaque composed of molding composition of inventive example IE 7 | Plaque composed of molding composition of inventive example IE 8 | Plaque composed of molding composition of example CE 2 |
|---|---|---|---|---|
| 0 | 30 | 32 | 25 | 51 |
| 10 | 69 | 67 | 69 | 63 |
| 20 | 75 | 74 | 74 | 67 |
| 30 | 77 | 77 | 78 | 69 |
| 60 | 78 | 79 | 80 | 72 |
| 120 | 80 | 81 | 82 | 74 |
| 240 | 81 | 83 | 84 | 75 |
| 600 | 83 | 85 | 85 | 76 |
| 1200 | 84 | 86 | 86 | 78 |
| 1800 | 85 | 87 | 86 | 79 |
| Time for darkening to revert to 20% | 18 sec | 27 sec | 20 sec | 100 sec |

TABLE 4

Transmittance (%) at 600 nm measured on 30 × 30 × 1 mm plaques as a function of time (fading); plaques were previously irradiated for 30 seconds with the LED panel; "0 seconds" therefore represents the first measurement after the end of irradiation.

| Time (seconds) | Plaque composed of molding composition of inventive example IE 9 | Plaque composed of molding composition of inventive example IE 10 | Plaque composed of molding composition of inventive example IE 11 | Plaque composed of molding composition of example CE 4 |
|---|---|---|---|---|
| 0 | 20 | 22 | 24 | 70 |
| 10 | 70 | 69 | 67 | 71 |
| 20 | 77 | 77 | 74 | 71 |
| 30 | 80 | 80 | 77 | 72 |
| 60 | 83 | 83 | 79 | 72 |
| 120 | 85 | 84 | 81 | 73 |
| 240 | 86 | 86 | 83 | 73 |
| 600 | 87 | 87 | 86 | 74 |
| 1200 | 89 | 88 | 88 | 75 |
| 1800 | 90 | 90 | 90 | 76 |
| Time for darkening to revert to 20% | 18 sec | 19 sec | 30 sec | 2000 sec |

In order to show that the materials—blends of PA6 or PA66 and PESTA (BAK 1095)—described in EP 922 731, discussed in the introduction, have insufficient transmittance and excessive haze and therefore cannot be used for the intended high-specification optical applications possible using the materials of the invention, the examples disclosed in EP 922 731 were repeated.

The following were used for this:

Polyesteramide (PESTA) composed of 60% by weight of caprolactam, 15.25% by weight of butanediol, and 24.75% by weight of adipic acid, with relative viscosity of 1.75 (0.5% in m-cresol).

PA6 polyamide: Grilon F34 with a viscosity number of 200 pursuant to ISO 1628-1 (EMS-CHEMIE AG)

Crystallization Accelerator: IT Extra Microtalk

TABLE 5

Comparative measurements on the examples given in EP 922 731, where exactly the same conditions were established for measurement of transmittance and of haze as for the values measured in Table 2.

| | Unit | CE 5 | CE 6 | CE 7 |
|---|---|---|---|---|
| corresponds in EP 922 731 to | | Comparative sample 1 | Sample 2 | Sample 4 |
| PA6 polyamide | % by wt. | 99.96 | 94.96 | 79.96 |
| PESTA | % by wt. | 0 | 5.00 | 20.0 |

TABLE 5-continued

Comparative measurements on the examples given in EP 922 731, where exactly the same conditions were established for measurement of transmittance and of haze as for the values measured in Table 2.

|  | Unit | CE 5 | CE 6 | CE 7 |
|---|---|---|---|---|
| Crystallization accelerator | % by wt. | 0.04 | 0.04 | 0.04 |
| Transmittance 50 µm/2 mm | % | 93/76 | 93/77 | 93/79 |
| Haze 50 µm/2 mm | % | 13/99 | 11/97 | 8/92 |

If one considers the values for transmittance, i.e. at a thickness of 2 mm, stated in Table 5 (the relevant comparison here being with the transmittance at 600 nm in the unexcited state from Table 2), it is clear that all of the materials of EP 922 731 have transmittance below 80%. It is also clear that the haze for the materials of EP 922 731 is quite unacceptably high for a material thickness of 2 mm.

For foil applications, e.g. for packaging, using foil thicknesses up to 50 µm, the transmittance and haze values measured from materials of EP 922 731 in Table 5 are adequate. However, at 2 mm layer thickness this type of material gives such high haze values and such low transmittance values that it is impossible to realize optical applications, and quite impossible to realize high-specification optical applications.

Key:

Tween 20 is a polyoxyethylene derivative of a fatty acid ester of sorbitan and is also termed Polysorbitat 20, and is a rolling application aid often used for various dyes.

The NCC® dye OP 14 BLUE from New Prismatic Enterprise Co., Ltd., Taiwan was used as photochromic dye.

Relative viscosity ($\eta_{rel}$) was determined to DIN EN ISO 307, in 0.5% by weight m-cresol solution at a temperature of 20° C.

Glass transition temperature (Tg), melting point (Tm), and enthalpy of fusion (Hm) were determined to ISO 11357-1/2.

Differential scanning calorimetry (DSC) was carried out using a heating rate of 20 K/min.

Haze and transmittance were determined at 23° C. using a Haze-Gard Plus from Byk-Gardener to ASTM D 1003 (illuminant C), on 70×2 mm disks.

Tensile modulus of elasticity, ultimate tensile strength and ultimate tensile strain were determined to ISO 527, using a tensile testing speed of 1 mm/min, on ISO tensile specimens, standard: ISO/CD 3167, type A1, 170×20/10×4 mm, at a temperature of 23° C.

Impact resistance and notched impact resistance (Charpy) were measured to ISO 179/*eU on ISO test specimens, standard: ISO/CD 3167, type B1, 80×10×4 mm, at a temperature of 23° C.

The concentrations of amino and carboxy end groups are determined by means of potentiometric titration. For the amino end groups here, from 0.2-1.0 g of polyamide or polyamide oligomer were dissolved in a mixture composed of 50 ml of m-cresol and 25 ml of isopropanol at from 50-90° C., and titrated with a 0.05 molar perchloric acid solution after addition of aminocaproic acid. For determination of COOH end groups, 0.2 to 1.0 g of the specimen to be determined is dissolved, as a function of solubility, in benzyl alcohol or in a mixture composed of o-cresol and benzyl alcohol, at 100° C., and titrated with a 0.1 molar tetra-n-butylammonium hydroxide solution after addition of benzoic acid.

The number-average molar mass of the polyamide segments was determined on the basis of the following equation:

$$m_R = \frac{(m - m_{H_2O}) * M_R}{M_n - M_R}$$

$$M_n = \frac{(m - m_{H_2O}) * M_R}{m_R} + M_R$$

$m_R$ = amount of regulator in g $m$ = amount of polyamide-forming monomers in g $m_{H2O}$ = amount of water produced in g $M_R$ = molar mass of regulator in g/mol $M_n$ = theoretical block length in g/mol

The invention claimed is:

1. A polyamide molding composition comprising at least one transparent polyesteramide in a proportion by weight of from 70 to 99.99% by weight;
　at least one further polymer in a proportion by weight of from 0 to 30% by weight;
　at least one photochromic dye in a proportion by weight of from 0.01 to 2% by weight; and
　wherein the transmittance of the at least one transparent polyesteramide and the further polymer and of the polyamide molding composition is at least 80% in the wavelength range from 500 to 700 nm when the at least one transparent polyesteramide in pure form, or the polyamide molding composition, or the further polymer in pure form, takes the form of a thin plaque of thickness 2 mm,
　wherein haze of the at least one transparent polyesteramide and of the further polymer and of the polyamide molding composition is at most 10% when the at least one transparent polyesteramide in pure form, or the polyamide molding composition, or the further polymer in pure form, takes the form of a thin plaque of thickness 2 mm,
　wherein the further polymer is a homopolyamide selected from the group of MACM12, MACM14, MACM18, or wherein the further polymer is a copolyamide selected from the group of MACM12/PACM12, MACM14/PACM14, MACM18/PACM18, or wherein the further polymer is a homopolyamide or copolyamide based on aromatic dicarboxylic acids having from 8 to 18 carbon atoms, or is a mixture of homopolyamides or copolyamides of this type or is selected from the group of: 6I/6T, TMDT, 6I/MACMI/MACMT, 6I/6T/MACMI, MACMI/MACM36, 6I, 12/PACMI, 12/MACMI, 12/MACMT, 12/MACM12, 6/PACMT, 6/6I, 6/IPDT, and
　wherein the at least one transparent polyesteramide is a polyesteramide that is (1) based on at least one polyamide based on dicarboxylic acids and on diamines, said diamine selected from the group of: MACM, PACM, and based on at least one polyester fraction or ester fraction based on a diol and on a dicarboxylic acid, or (2) based on laurolactam or on aminolauric acid, and based on at least one polyester fraction or ester fraction based on a diol and on a dicarboxylic acid.

2. The polyamide molding composition as claimed in claim 1, wherein at least one polyesteramide is composed of a polyamide fraction making up from 40 to 95% by weight and of an ester fraction and/or polyester fraction making up from 5 to 60% by weight, where the arrangement of the polyamide units and polyester units as repeat units in the polyesteramide can be random, alternating, or blockwise.

3. The polyamide molding composition as claimed in claim 1, wherein the proportion by weight present of the at least one transparent polyesteramide is from 80 to 99.9% by weight.

4. The polyamide molding composition as claimed in claim 1, which comprises no further polymer.

5. The polyamide molding composition as claimed in claim 1, wherein the solution viscosity ($\eta_{rel}$) of the polyesteramide in m-cresol, 0.5% by weight, at 20° C., is from 1.3 to 2.5, and/or its modulus of elasticity is less than 2000 MPa.

6. The polyamide molding composition as claimed in claim 1, wherein the glass transition temperature of the further polymer is above 90° C. and its transmittance is more than 85%.

7. The polyamide molding composition as claimed in claim 1, wherein the at least one dicarboxylic acid has been selected from the group of: aliphatic C4-C44 diacid, cycloaliphatic C8-C20 diacid, aromatic diacid, TPA, IPA, or NDA, or else a mixture or combination thereof.

8. The polyamide molding composition as claimed in claim 7, wherein the at least one dicarboxylic acid has been selected from the group of: sebacic acid, dodecanedioic acid, terephthalic acid, isophthalic acid, and mixtures thereof.

9. The polyamide molding composition as claimed in claim 1, wherein the diol has been selected from the group of: aliphatic C2-C36 diol, cycloaliphatic C6-C36 diol, C8-C36 diol having an aromatic ring, a diol containing ether groups, polycaprolactonediol, or a combination thereof, or being selected from the group of: ethanediol, propanediol, butanediol, hexanediol, cyclohexanedimethanol, C36 dimer fatty diol, polyoxyalkylenediols (C2-C4-alkylene), in particular with a molar mass in the range from 200 to 2000 g/mol, polycaprolactonediol with a molar mass in the range from 500 to 3000 g/mol, and also combinations thereof, where, if polyoxyalkylenediols are present, their concentration, based on the entire polyester fraction or ester fraction, is at most 75% by weight.

10. The polyamide molding composition as claimed in claim 1, wherein the polyester fraction and/or ester fraction is a polyester composed of a C36 diol and/or adipic acid and/or sebacic acid and/or C36 dimer fatty acid and/or terephthalic acid.

11. The polyamide molding composition as claimed in claim 1, wherein the glass transition temperature, deriving from the ester fraction or polyester fraction and from an amorphous phase formed therefrom, of the transparent polyesteramide is below 20° C.

12. The polyamide molding composition as claimed in claim 1, wherein the transparent polyesteramide contains at least one amorphous or microcrystalline hard segment, where the number-average molar mass of these amorphous or microcrystalline polyamide hard segment is in the range from 500 to 5000 g/mol.

13. The polyamide molding composition as claimed in claim 12, wherein the glass transition temperature of the microcrystalline polyamide hard segment is above at least 50° C. and/or its melting point is at least 120° C.

14. The polyamide molding composition as claimed in claim 12, wherein the glass transition temperature of the amorphous polyamide hard segment is above at least 50° C.

15. The polyamide molding composition as claimed in claim 1, wherein the further polymer is a polyamide based on aliphatic and/or cycloaliphatic diamines and on aliphatic and/or aromatic dicarboxylic acids having from 6 to 40, or is a mixture of homopolyamides and/or copolyamides of this type, and/or is a polyamide block copolymer having soft segments, and/or has been selected from the following group: polyester having soft segments; TPU elastomers having soft segments; acrylate polymer; methacrylate polymer, and/or having long pendant groups; polycarbonate copolymer; styrene copolymer, based on acrylonitrile, butadiene, acrylate, methacrylate; polyolefin, grafted polyolefin; ethylene copolymers, in particular based on propene, butene, pentene, hexene, octene, decene, undecene, butadiene, styrene, acrylonitrile, isoprene, isobutylene, derivatives of (meth)acrylic acid, vinyl acetate, tetrafluoroethylene, vinylidene fluoride, hexafluoropropene, and 2-chlorobutadiene; polyisobutylene; polybutyl acrylate, and also combinations and mixtures thereof.

16. The polyamide molding composition as claimed in claim 1, wherein the solution viscosity ($\eta_{rel}$) of the further polymer, in the form of a transparent, amorphous or microcrystalline homopolyamide and/or copolyamide, is from 1.3 to 2.0, and/or its glass transition temperature Tg is above 90° C.

17. The polyamide molding composition as claimed in claim 1, wherein the photochromic dye is a dye which is reversibly excitable by UV or short-wave VIS.

18. The polyamide molding composition as claimed in claim 1, wherein the additives are stabilizers, such as UV stabilizers, heat stabilizers, or free-radical scavengers, and/or are processing aids, plasticizers, or further polymers, and/or are functional additives.

19. The polyamide molding composition as claimed in claim 1, which comprises polyamide-12.

20. The polyamide molding composition as claimed in claim 1, wherein the ratio of the solution viscosities ($\eta_{rel}$) of the further transparent polymer and of the polyesteramide is smaller than 1.2.

21. A transparent article with at least one region or one layer composed of a polyamide molding composition as claimed in claim 1.

22. The article as claimed in claim 21, for high-specification optical applications, whose haze is less than 10, and whose transmittance is more than 80%, in the wavelength range from 500-700 nm, when the layer thickness of the layer composed of the polyamide molding composition is 2 mm.

23. The article as claimed in claim 21, which is a foil, a profile, a tube, a hollow body, or an optically variable filter, or an optical lens, and which is selected from an ophthalmic lens, an element with spectral filter action, a spectacle lens, sun lens, corrective lens, or optical filter, or a switching assembly for optical signal processing, ski goggles, visor, safety spectacles, photorecording, display, optical data storage, or windows of buildings and of vehicles, or a decorative element or a structural element, a spectacle frame, toy, or cover, a mobile-telephone case, a part of electronic devices, a coating, particularly of packaging, of decorative items, of sports equipment, or of cladding.

24. The article as claimed in claim 21, which has a color gradient and/or has a photochromic coating, an antireflective coating, a scratch-resistant coating, an optical filter coating, a polarizing coating, an oxygen-barrier coating, or a combination of these coatings.

25. The article as claimed in claim 21, wherein the glass transition temperature of the region or the layer composed of the polyamide molding composition is above 50° C., and/or its melting point is above 120° C.

26. A process for the production of a bulk-colored molding as claimed in claim 21, which comprises compounding the photochromic dye together with the polyesteramide and with the further polymer, where the dye can be added in the form of a liquid concentrate to the polymer melt composed of polyesteramide and of further polymer with the aid of a metering pump, and/or the dye is applied in the form of solid or liquid to the other components in a drum mixer, and where use may also, if appropriate, be made of aids to a rolling application process.

27. A process for the production of an article as claimed in claim 21, which comprises molding a polyamide molding composition as claimed in claim 1 in an extrusion process, in an injection-molding process, or in an in-mold-coating process, to give the article, where the photochromic dye can, if appropriate, be introduced in a downstream dip-coat-bath process and/or thermal transfer process into the mixture composed of transparent polyesteramide and of further polymer, and where the photochromic article can also be a foil which can be applied to a substrate, via in-mold-coating, lamination, or adhesive bonding.

28. The process for the production of a bulk-colored molding as claimed in claim 27, wherein the dye and the polyesteramide and/or the further polymer is processed to give a masterbatch with high color concentration, of up to 30%, and the required amount of said masterbatch is processed with the polyesteramide and/or with the further polymer in an extruder to give pellets or is directly converted in the injection-molding machine to the finished molding.

29. The polyamide molding composition as claimed in claim 1, wherein the transmittance of the polyesteramide and/or of the further polymer and/or of the polyamide molding composition is greater than 88%.

30. The polyamide molding composition as claimed in claim 1, wherein the haze of the polyesteramide and/or of the further polymer and/or of the polyamide molding composition is at most 5%.

31. The polyamide molding composition as claimed in claim 1, wherein the proportion by weight present of the at least one transparent polyesteramide is from 95 to 99.9% by weight, and there is only one such transparent polyesteramide present.

32. A polyamide molding composition comprising
at least one transparent polyesteramide in a proportion by weight of from 70 to 99.99% by weight;
at least one further polymer in a proportion by weight of from 0 to 30% by weight;
at least one photochromic dye in a proportion by weight of from 0.01 to 2% by weight; and
wherein the transmittance of the at least one transparent polyesteramide and the at least one further polymer and of the polyamide molding composition is at least 80% in the wavelength range from 500 to 700 nm when the at least one transparent polyesteramide in pure form, or the molding composition, or the at least one further polymer in pure form, takes the form of a thin plaque of thickness 2 mm,
wherein haze of the at least one transparent polyesteramide and of the further polymer and of the polyamide molding composition is at most 10% when the at least one transparent polyesteramide in pure form, or the polyamide molding composition, or the further polymer in pure form, takes the form of a thin plaque of thickness 2 mm,
wherein the further polymer is a homopolyamide selected from the group of MACM12, MACM14, MACM18, or wherein the further polymer is a copolyamide selected from the group of MACM12/PACM12, MACM14/PACM14, MACM18/PACM18, or wherein the further polymer is a homopolyamide or copolyamide based on aromatic dicarboxylic acids having from 8 to 18 carbon atoms, or is a mixture of homopolyamides or copolyamides of this type or is selected from the group of: 6I/6T, TMDT, 6I/MACMI/MACMT, 6I/6T/MACMI, MACMI/MACM36, 6I, 12/PACMI, 12/MACMI, 12/MACMT, 12/MACM12, 6/PACMT, 6/6I, 6/IPDT, and
wherein the at least one transparent polyesteramide is a polyesteramide that is (1) based on at least one polyamide based on dicarboxylic acids and on diamines, or (2) based on lactams or on aminocarboxylic acids, and based on at least one polyester fraction or ester fraction based on a C36 diol and on a dicarboxylic acid.

33. The polyamide molding composition as claimed in claim 32, wherein the diamine has been selected from the group of: branched or unbranched aliphatic C4-C18 diamine, cycloaliphatic C8-C20 diamine, polyoxyalkylenediamines (C2-C4-alkylene), diamine having an aromatic ring, MXDA or PXDA, and also mixtures or combinations thereof, where, if polyoxyalkylenediamines are present, their concentration, based on the entire polyester fraction or ester fraction, is at most 75% by weight.

34. The polyamide molding composition as claimed in claim 33 wherein the diamine has been selected from the group of: methylpentanediamine, hexanediamine, methyloctanediamine, nonanediamine, decanediamine, dodecanediamine, m-xylylenediamine, MACM, PACM.

35. The polyamide molding composition as claimed in claim 32, wherein the at least one lactam or the at least one aminocarboxylic acid has been selected from the group of: caprolactam, laurolactam, aminocaproic acid, aminolauric acid, aminoundecanoic acid.

36. The polyamide molding composition as claimed in claim 32, wherein the transparent polyesteramide is a polyesteramide based on a polyamide system, selected from the group of: PA6, PA66, PA610, PA612, PA6/12, PA11, PA12, PA MACM6-18, PA PACM6-18, MACM6-18/PACM6-18, a copolyamide involving 6T, 9T, 10T, and/or 12T units, and mixtures and/or combinations thereof.

37. The polyamide molding composition as claimed in claim 32, wherein the polyester fraction and/or ester fraction are based on a C36 diol and on a dicarboxylic acid selected from the group of sebacic acid, dodecanoic acid, C36 dimer fatty acid, and terephthalic acid.

38. The polyamide molding composition as claimed in claim 32, wherein the polyester fraction and/or ester fraction are based on a C36 dimer fatty diol and on a dicarboxylic acid selected from the group of sebacic acid, dodecanoic acid, C36 dimer fatty acid, and terephthalic acid.

39. A polyamide molding composition comprising
at least one transparent polyesteramide in a proportion by weight of from 70 to 99.99% by weight;
at least one further polymer in a proportion by weight of from 0 to 30% by weight;
at least one photochromic dye in a proportion by weight of from 0.01 to 2% by weight; and
wherein the transmittance of the at least one transparent polyesteramide and the at least one further polymer and of the polyamide molding composition is at least 80% in the wavelength range from 500 to 700 nm when the at least one transparent polyesteramide in pure form, or the molding composition, or the at least one further polymer in pure form, takes the form of a thin plaque of thickness 2 mm,
wherein haze of the at least one transparent polyesteramide and of the further polymer and of the polyamide molding composition is at most 10% when the at least one transparent polyesteramide in pure form, or the polyamide molding composition, or the further polymer in pure form, takes the form of a thin plaque of thickness 2 mm, wherein the further polymer is a homopolyamide selected from the group of MACM12, MACM14, MACM18, or wherein the further polymer is a copolyamide selected from the group of MACM12/PACM12, MACM14/PACM14, MACM18/PACM18, or wherein the further polymer is a homopolyamide or copolyamide based on aromatic dicarboxylic acids having from 8 to 18 carbon atoms, or is a mixture of homopolyamides or copolyamides of this type or is selected from the group of: 6I/6T, TMDT, 6I/MACMI/MACMT, 6I/6T/MACMI, MACMI/MACM36, 6I, 12/PACMI, 12/MACMI, 12/MACMT, 12/MACM12, 6/PACMT, 6/6I, 6/IPDT, and wherein the at least one transparent polyesteramide is a polyesteramide that is (1) based on at least one polyamide based on dicarboxylic acids and on diamines, said diamine selected from the group of: MACM, PACM, and based on at least one polyester fraction or ester fraction based on a diol and on a dicarboxylic acid, said dicarboxylic acid selected from the group of: sebacic acid, dodecanedioic acid, terephthalic acid, isophthalic acid, and mixtures thereof or (2) based on laurolactam or on aminolauric acid, and based on at least one polyester fraction or ester fraction based on a C36 diol and on a dicarboxylic acid.

40. The polyamide molding composition as claimed in claim 39, wherein the polyester fraction and/or ester fraction are based on a C36 diol and on a dicarboxylic acid selected from the group of sebacic acid, dodecanoic acid, C36 dimer fatty acid, and terephthalic acid.

41. The polyamide molding composition as claimed in claim 39, wherein the polyester fraction and/or ester fraction are based on a C36 dimer fatty diol and on a dicarboxylic acid selected from the group of sebacic acid, dodecanoic acid, C36 dimer fatty acid, and terephthalic acid.

* * * * *